June 16, 1959   R. L. SMIRL ET AL   2,890,602
TRANSMISSION
Filed May 8, 1956
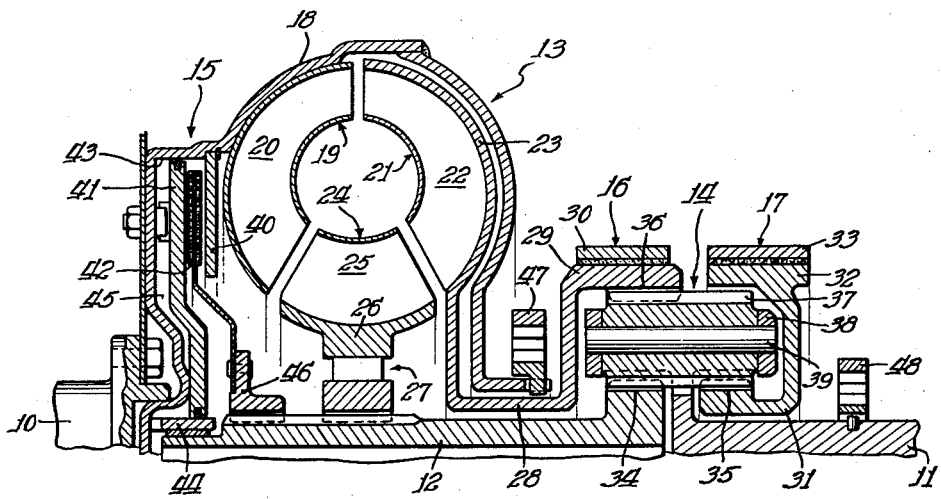
Inventors:
Richard L. Smirl and
Mieczyslaw J. Waclawek
By: Keith J. Bleuer   Atty.

United States Patent Office 2,890,602
Patented June 16, 1959

2,890,602

TRANSMISSION

Richard L. Smirl and Miczyslaw J. Waclawek, Chicago, Ill., assignors to Borg-Warner Corporation, Chicago, Ill., a corporation of Illinois Application May 8, 1956, Serial No. 583,545

4 Claims. (Cl. 74—688)

Our invention relates to transmissions for automotive vehicles and particularly to transmissions comprising hydraulic torque converters for transmitting drive between the drive shaft and driven shaft of an automotive vehicle.

In co-pending application S.N. 488,509 of John W. Holdeman, filed February 16, 1955, there is disclosed a transmission including a planetary gear set connected in tandem with a hydraulic torque converter for providing a low speed drive, a high speed drive, and a drive in reverse. The planetary gear set has a ring gear, two sun gears, a plurality of planet gears each of which is in mesh with the sun gears and ring gear, and a planet gear carrier. The ring gear is driven by the turbine element of the torque converter; the first of the sun gears is driven by the stator element of the torque converter; and the planet gear carrier is connected to the driven shaft. For low speed drive, the second sun gear is held against rotation for providing torque multiplication through the planetary gear set and the driven shaft is driven at a torque which is the product of torque multiplication produced by the hydraulic torque converter and the planetary gear set. For high speed drive, a clutch is provided in connection with the planetary gear set to lock parts of the gear set together for unitary rotation and all of the power from the drive shaft proceeds through the hydraulic torque converter so that there is considerable slip in the hydraulic unit. For reverse drive, the turbine element of the torque converter is held stationary and the stator drives the driven shaft in a reverse direction.

It is an object of the present invention to provide a transmission of this type which includes a direct drive clutch for connecting the drive shaft with one of the elements of the planetary gear set whereby in high speed drive, there is a two path power flow to the driven shaft, one element of the gear set being driven by the turbine element of the hydraulic torque converter and another element of the gear set being driven directly by the drive shaft through the direct drive clutch. A substantial portion of the torque thus by-passes the converter whereby to reduce the amount of slippage in high speed drive. The use of the two path power flow in high speed drive with a consequent reduction in slippage has the advantage of increasing the efficiency of the drive and also reducing the amount of heat generated by the torque converter while retaining the cushioning effect of the torque converter.

In transmissions of the general type wherein a planetary gear set is connected in tandem with a torque converter to provide two forward speed drives, the gear ratio for low speed drive must be used for the passing gear and also for hill braking. It is desirable to have a mild gear ratio such as 1.5 to 1 for passing but such a ratio is inadequate for hill braking. Consequently, a good passing gear must be sacrificed in order to obtain adequate hill braking. A further object of the present transmission is to provide both adequate hill braking and a good passing gear ratio. It is contemplated that hill braking be obtained by engaging the direct drive clutch and at the same time holding the turbine element of the torque converter stationary so that hill braking is separate and distinct from the passing gear.

The invention consists of the novel constructions, arrangements and devices to be hereinafter described and claimed for carrying out the above stated objects and such other objects as will appear from the following description of a preferred embodiment of the invention illustrated with reference to the accompanying drawing which is a schematic illustration of a transmission embodying the principles of the invention.

Referring to the drawing, the transmission, in general, comprises a drive shaft 10, a driven shaft 11, an intermediate shaft 12, a torque converter 13, a planetary gear set 14, a direct drive clutch 15, and two friction brakes 16 and 17.

The hydraulic torque converter 13 includes a housing 18 connected to said drive shaft 10 and adapted to be driven thereby. The torque converter 13 also includes an impeller 19, the hollow shell of which is a part of and is integral with the converter housing 18 and having spaced blades 20 fixed within the housing. The converter 13 includes also a turbine or driven element 21 having spaced blades 22 fixed to an outer shell 23. The torque converter also includes a stator 24 having spaced blades 25 fixed to an outer shell 26. A one-way device 27 is disposed between the stator 24 and the intermediate shaft 12.

The torque converter 13 is of conventional construction, there being fluid contained in the housing 18. The impeller 19 is driven by the drive shaft 10 and the impeller drives the fluid within the housing against the turbine 21 and the stator 24. The turbine 21 is driven initially at an increased torque with respect to that applied on the drive shaft 10, and the reaction element or stator 24 takes the reaction for providing this increased torque. During this operation, the stator 24 tends to rotate reversely with respect to the direction of rotation of the drive shaft 10 but is held stationary by the shaft 12 and the one-way device 27. After a predetermined speed of rotation of the turbine 21 is reached, the reaction of the stator 24 at this time changes from the reverse direction to the forward direction, and the stator 24 then rotates in the forward direction, being free for such rotation due to a releasing of the one-way device 27. The torque converter 13 thereafter functions as a simple two element fluid coupling, and the turbine 21 during this period of operation is driven at the same torque as that applied on the drive shaft 10.

A sleeve shaft 28 is connected to the turbine 21 and is disposed over the intermediate shaft 12. The brake 16 is effective on the shaft 28 and comprises a brake drum 29 and a brake band 30 engageable on the outer periphery of the drum. The brake band 30 may be brought into engagement with the brake drum 29 by any suitable servo motor (not shown).

A sleeve shaft 31 is disposed over the shaft 11. The brake 17 is effective on the shaft 31 and is similar in construction to the brake 16. The brake 17 comprises a drum 32 and a brake band 33 engageable on the outer periphery of the drum. Any suitable servo motor (not shown) may be used in connection with the brake band 33 for engaging it on the drum 32.

The planetary gear set 14 comprises a sun gear 34 formed integrally on the shaft 12 and a sun gear 35 formed integrally on the shaft 31, a ring gear 36 formed integrally on the shaft 28, a plurality of planet gears 37 in mesh with both the sun gears 34 and 35 and with the ring gear 36 and a carrier 38 for the planet gears 37. The carrier 38 comprises a plurality of stub shafts 39 on each of which is rotatably disposed one of the planet gears 37. The carrier 38 is connected to the driven shaft 11.

The direct drive clutch 15 comprises an axially stationary pressure plate 40 fixed within the housing 18, an annular piston 41 and a friction disc 42 disposed between the plate 40 and the piston 41. An annular cavity 43 is formed within the housing 18 and is defined at its center by means of an axially extending hub 44, and the piston 41 is slidably disposed within the cavity 43. The cavity 43 forms a chamber 45 between the piston 41 and the adjacent end of the housing 18, and fluid under pressure is adapted to be applied to the chamber 45. The clutch disc 42 is connected by means of a hub 46 to the intermediate shaft 12.

The transmission is provided with fluid pumps 47 and 48 for supplying fluid pressure to the chamber 45 of the direct drive clutch 15 and to the servo motors (not shown) of the friction brakes 16 and 17 for actuating the clutch and brakes for providing the different speed ratios for the transmission. The pump 47 is driven by the housing 18 of the torque converter 13, and the pump 48 is driven by the driven shaft 11.

The illustrated transmission provides low and high speed forward drives and a drive in reverse. The low speed forward drive is completed by engaging the brake 17 by applying the band 33 to the drum 32. The brake 17, when engaged for completing the low speed forward drive, holds the shaft 31 and thereby the sun gear 35 against rotation. The planet gears 37, although they planetate about the sun gears 34 and 35, function to also hold the sun gear 34 and the shaft 12 against rotation. It is clear that there can be no relative rotation between the sun gears 34 and 35, since the sun gears are of equal size and any such relative rotation would produce a skewing of the planet gears 37 with respect to the sun gears 34 and 35 which is prevented by the carrier 38. The brake 17 is the ultimate device taking reaction of the torque converter stator 24, the connection from the stator to the brake being through the one-way device 27, the shaft 12, the sun gear 34, the planet gears 37, the sun gear 35, and the shaft 31. The torque converter 13 on initial completion of the low speed forward drive functions to drive the turbine 21 and the shaft 28 at an increased torque with respect to the torque impressed on the drive shaft 10. The power flows from the drive shaft 10 through the impeller 19, the turbine 21, the shaft 28, the ring gear 36, the planet gears 37 and the planet gear carrier 38 to the driven shaft 11. The planet gears 37 planetate between the ring gear 36 and the sun gear 35, and the carrier 38 and the driven shaft 11 are driven. The sun gear 35 is held from rotation by the brake 17 and constitutes the reaction member of the gear set 14, so that the gear set multiplies torque. The torque impressed on the shaft 11 is the product of the torque multiplications produced by the hydraulic torque converter 13 and the planetary gear set 14, since these two units are effectively connected in tandem or series. When the speed of the turbine 21 increases sufficiently, the turbine 21 and its output shaft 28 are driven at the same torque as the drive shaft 10, and, at this time, the torque multiplication between the shafts 10 and 11 is produced solely by the planetary gear set 14.

For high speed forward drive, the friction brake 17 is disengaged, and the clutch 15 is engaged. In high speed forward drive there are two power paths from the drive shaft 10 to the planetary gear set 14. One of the power paths exists from the drive shaft 10 through the clutch 15, the shaft 12 and the sun gear 34, to the planet gears 37. The other power path extends from the drive shaft 10 through the impeller 19, the turbine 21, the shaft 28, and the ring gear 36, to the planet gears 37. The two power paths are recombined in the planetary gear set 14. Assuming that the torque converter 13 is functioning as a fluid coupling, that is, that all the elements of the torque converter rotate at substantially the same speed, the sun gear 34 and the ring gear 36 rotate at substantially the same speed. In effect, the gear set 14 is locked up so that all of the elements of the gear set 14 rotate together, and the carrier 38 and the driven shaft 11 are driven at the same speed as the drive shaft 10.

Reverse drive is obtained by engaging the brake 16 while maintaining the clutch 15 and the brake 17 disengaged. The brake 16 functions to hold the shaft 28 and the turbine 21 of the torque converter stationary, and both the ring gear 36 and the turbine 21 are held from rotation. The gear 36 functions as a reaction element for the gear set 14, and the turbine 21 functions as a reaction element for the torque converter 13. The fluid force on the stator 24 is in the reverse direction, and the stator drives the shaft 12 and the sun gear 34 through the one-way device 27 which is engaged for this direction of drive. The planet gears 37 are driven by the sun gear 34 and planetate within the now stationary ring gear 36, so that the carrier 38 and thereby the shaft 11 to which the carrier is connected are driven in the reverse direction. The torque converter 13 under these conditions multiplies torque, and the planet gear set 14 also multiplies torque, so that the shaft 11 is driven in the reverse direction at an increased torque which is the product of the torque multiplication produced by the torque converter 13 and the torque multiplication produced by the planetary gear set 14.

Braking the vehicle by means of the vehicle engine, is, of course, possible in either low speed forward drive or high speed forward drive with the brake 17 or the clutch 15 respectively engaged, since both of these drives are two-way drives. An augmented braking effect for the vehicle may be provided by a simultaneous engagement of the clutch 15 and the brake 16. Engagement of the brake 16 holds the turbine 21 of the torque converter 13 stationary. The turbine, when stationary functions to considerably retard the rotation of the impeller 19 through the fluid of the torque converter 13. Engagement of the clutch 15 connects the driven shaft 11 through the planet gears 37 and the sun gear 34 to the impeller 19 by means of the converter housing 18 to which the impeller is rigidly attached. Since the engagement of brake 16 holds the ring gear 36 stationary, this element constitutes the reaction element of the gear set 14 and the impeller 19, the converter housing 18, the drive shaft 10, and the vehicle engine are driven at an overdrive, the engine rotating at approximately three times the speed of rotation of the driven shaft 11.

From the foregoing description, it can be seen that there has been provided an improved transmission which provides a two path power flow in high speed drive which reduces slippage and increases efficiency of the torque converter. Our improved transmission also has the advantage of better gear selection due to the use of the particular type of hill brake.

While we have described our invention in connection with certain specific embodiments thereof, it is to be understood that this is by way of illustration and not by way of limitation and the scope of our invention is defined solely by the appended claims which should be construed as broadly as the prior art will permit.

We claim:

1. In a transmission, the combination of a drive shaft, a driven shaft, a hydraulic torque converter comprising an impeller and a turbine and a stator, said impeller being connected to said drive shaft, a planetary gear set comprising a planet gear and a planet gear carrier element and a pair of coaxial gears in mesh with said planet gear on one side thereof and a gear element in mesh with said planet gear on the other side thereof, one of said elements being connected to said turbine and the other of said elements being connected to said driven shaft, a first one of said pair of coaxial gears being connected with said stator, a brake for the other of said pair of coaxial gears for completing a low speed drive from said impeller to said turbine and through said planetary gear set with the reaction of said stator being taken through said planet gear and said pair of coaxial gears, and a clutch for connecting said first one of said pair of coaxial gears with said drive shaft for completing a two path power flow drive from said drive shaft to said driven shaft through said torque converter and said planetary gear set.

2. In a transmission, the combination of a drive shaft, a driven shaft, a hydraulic torque converter comprising an impeller and a turbine and a stator, said impeller being connected to said drive shaft, a planetary gear set comprising a planet gear and a planet gear carrier element and a pair of gears in mesh with said planet gear on one side thereof and a gear element in mesh with said planet gear on the other side thereof, one of said elements being connected to said turbine and the other of said elements being connected to said driven shaft, a first one of said pair of gears being connected with said stator, a brake for the other of said pair of gears for completing a low speed drive from said impeller to said turbine and through said planetary gear set with the reaction of said stator being taken through said planet gear and said pair of gears, a clutch for connecting said first one of said pair of gears with said drive shaft for completing a two path power flow drive from said drive shaft to said driven shaft through said torque converter and said planetary gear set, and brake means for said turbine for providing a reverse drive.

3. In a transmission for an automotive vehicle, the combination of a drive shaft, a driven shaft, a hydraulic torque converter comprising an impeller and a turbine and a stator, said impeller being connected to said drive shaft, a planetary gear set comprising a planet gear and a planet gear carrier element and a pair of gears in mesh with said planet gear on one side thereof and a gear element in mesh with said planet gear on the other side thereof, one of said elements being connected to said turbine and the other of said elements being connected to said driven shaft, a first one of said pair of gears being connected with said stator, a brake for the other of said pair of gears for completing a low speed drive from said impeller to said turbine and through said planetary gear set with the reaction of said stator being taken through said planet gear and said pair of gears, a clutch for connecting said first one of said pair of gears with said drive shaft for completing a two path power flow drive from said drive shaft to said driven shaft through said torque converter and said planetary gear set, brake means for said turbine for providing a reverse drive, and means for simultaneously engaging said clutch and said last named brake means whereby to provide vehicle braking.

4. In a transmission for an automotive vehicle, the combination of a drive shaft, a driven shaft, a hydraulic torque converter comprising an impeller and a turbine and a stator, said impeller being connected to said drive shaft, a planetary gear set comprising a planet gear and a planet gear carrier element and a pair of gears in mesh with said planet gear on one side thereof and a gear element in mesh with said planet gear on the other side thereof, one of said elements being connected to said turbine and the other of said elements being connected to said driven shaft, a first one of said pair of gears being connected with said stator, a brake for the other of said pair of gears for completing a low speed drive from said impeller to said turbine and through said planetary gear set with the reaction of said stator being taken through said planet gear and said pair of gears, a clutch for connecting said first one of said pair of gears with said drive shaft for completing a two path power flow drive from said drive shaft to said driven shaft through said torque converter and said planetary gear set, brake means for said turbine for providing a reverse drive, means for simultaneously engaging said clutch and said last named brake means whereby to provide vehicle braking.

References Cited in the file of this patent
UNITED STATES PATENTS

| | | |
|---|---|---|
| 2,606,460 | Kelley | Aug. 12, 1952 |
| 2,695,533 | Pollard | Nov. 30, 1954 |